(12) United States Patent
Uchida

(10) Patent No.: US 7,161,814 B2
(45) Date of Patent: Jan. 9, 2007

(54) DC-DC CONVERTER WITH INDUCTANCE ELEMENT FOR DETECTING OUTPUT CURRENT WITH ACCURACY

(75) Inventor: Akihiro Uchida, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 11/078,672

(22) Filed: Mar. 10, 2005

(65) Prior Publication Data

US 2005/0201126 A1  Sep. 15, 2005

(30) Foreign Application Priority Data

Mar. 12, 2004 (JP) ............................. P2004-070402

(51) Int. Cl.
*H02M 3/335* (2006.01)

(52) U.S. Cl. .............................. 363/21.12; 363/21.15; 363/21.16; 363/21.18

(58) Field of Classification Search ............. 363/21.12, 363/21.15, 21.16, 21.17, 21.18
See application file for complete search history.

(56) References Cited

U.S. PATENT DOCUMENTS

| 6,466,463 | B1* | 10/2002 | Morita ..................... 363/21.16 |
| 6,515,876 | B1* | 2/2003 | Koike et al. ............. 363/21.16 |
| 6,519,165 | B1* | 2/2003 | Koike ..................... 363/21.12 |
| 6,525,947 | B1* | 2/2003 | Umetsu et al. .......... 363/21.15 |
| 6,590,790 | B1* | 7/2003 | Hosotani et al. ......... 363/21.16 |
| 6,597,589 | B1* | 7/2003 | Wang ..................... 363/21.18 |

* cited by examiner

*Primary Examiner*—Bao Q. Vu
(74) *Attorney, Agent, or Firm*—Bachman & LaPointe, P.C.

(57) ABSTRACT

A DC-DC converter is provided which comprises an inductance element 10 having a plurality of in-phase windings $N_B$, $N_A$ wound around a common magnetic core and connected to a load 5; a normal power source 16 for generating a reference voltage; a comparator 18 for comparing a voltage produced across winding $N_A$ with reference voltage $V_R$ of normal power souce 16 to produce an error signal. As a same electric current $I_O$ flows through the windings $N_B$, $N_A$ of inductance element 10 in the opposite directions to each other to produce in magnetic core of inductance element 10 opposed magnetic fluxes which countervail each other and any kind of noise such as ripple and spike noises causing voltage fluctuation.

4 Claims, 2 Drawing Sheets

DC-DC CONVERTER WITH INDUCTANCE ELEMENT FOR DETECTING OUTPUT CURRENT WITH ACCURACY

TECHNICAL FIELD

This invention relates to a DC-DC converter, in particular, of the type capable of detecting an output current with accuracy and less power loss.

BACKGROUND OF THE INVENTION

FIG. 3 illustrates an example of conventional flyback type DC-DC converters. The shown prior art DC-DC converter 4 comprises a bridge rectifier 2 connected to an AC power source 1 for full-wave rectification of AC voltage E from power source 1; an input smoothing capacitor 3 for smoothing output from bridge rectifier 2 into stable DC output voltage $V_O$ to a load 5. Converter 4 further comprises a primary winding 6a of a transformer 6 and a MOS-FET 7 as a switching element connected in series to input smoothing capacitor 3; a secondary winding 6b of transformer 6 connected to a rectifying smoother which has a rectifying diode 8 and an output smoothing capacitor 9; a choke coil 10 of common mode as an inductance element; a detection circuit 11 for picking out DC voltage $V_{DC}$ produced from output smoothing capacitor 9; and a control circuit 13 for producing drive signals $V_G$ to regulate on-off period of MOS-FET 7 based on detection signals transmitted from detection circuit 11 through a photo-coupler 12 to control circuit 13. Choke coil 10 has two windings $N_A$ and $N_B$ wound around a common magnetic core in in-phase or common mode relation to each other to form the inductance element connected in a line between output smoothing capacitor 9 and load 5.

In operation, control circuit 13 produces drive signals $V_G$ to gate terminal of MOS-FET 7 to alternately turn MOS-FET 7 on and off, and thereby apply intermittent AC voltage of high frequency on primary winding 6a of transformer 6. Resultant AC voltage is taken out from secondary winding 6b of transformer 6, and further rectified, smoothed and converted into DC voltage $V_{DC}$ through rectifying diode 8 and output smoothing capacitor 9. Detection circuit 11 picks out DC voltage $V_{DC}$ from output smoothing capacitor 9 to produce detection signals to control circuit 13 through photo-coupler 12. Control circuit 13 provides gate terminal of MOS-FET 7 with drive signals $V_G$ regulated based on detection signals from detection circuit 11 to appropriately adjust on-off period of MOS-FET 7 so that output smoothing capacitor 9 produces stable DC voltage $V_{DC}$, removing common mode noise by choke coil 10 to apply DC output voltage $V_O$ to load 5 without noises.

In the DC-DC converter 4 shown in FIG. 3, there is provided an overcurrent protector 14 for restricting DC output current $I_O$ to load 5 to avoid possible damage to load 5 and converter 4 in case of excessive output current $I_O$ flowing through load 5. Overcurrent protector 14 comprises a current detecting resistor 15 connected in series to first winding $N_A$ of choke coil 10 for sensing output current $I_O$ through load 5 as a voltage value corresponding to the amount of output current $I_O$; a normal power source 16 for producing a reference voltage $V_R$ to define a rated value of output current $I_O$ flowing through load 5; and an error amplifier 18 as a comparator for comparing detected voltage $V_L$ applied to inverted input terminal (-) of error amplifier 18 from current detecting resistor 15 through a limiting resistor 17 with reference voltage $V_R$ applied to non-inverted input terminal (+) of error amplifier 18 from normal power source 16. When current detection voltage $V_{LD}$ exceeds reference voltage $V_R$, error amplifier 18 produces an error signal $V_{OC}$ to control circuit 13 through detection circuit 11 and photo-coupler 12 so that control circuit 13 reduces the time width of drive signals $V_G$ of high voltage level to gate terminal of MOS-FET 7 and thereby shorten the on period of MOS-FET 7 in order to restrict output current $I_O$ passing through load 5. In the DC-DC converter 4 shown in FIG. 3, as current detecting resistor 15 has the own electric resistance for impeding passage of output current $I_O$, it provides electric power loss which deteriorates conversion efficiency of the converter, and moreover causes thermal loss proportional to the square of output current $I_O$. Accordingly, in case current detecting resistor 15 radiates a large amount of heat emitted during the operation, a problem arises in that such heat would make various repressions in mounting current detecting resistor 15 or other peripheral electric elements.

Japanese Patent Disclosure No. 6-269159 shows a switching power source circuit which comprises a choke coil connected in a line between input and output terminals for attenuating ripple noise or spike noise on the line; and a voltage detector connected between both ends of the choke coil for detecting a current value through the choke coil as a voltage drop by resistance component of the choke coil to provide a given output voltage and protect electric elements against excess current without current detecting resistor.

Japanese Patent Disclosure No. 2001-309654 demonstrates a ringing choke converter having a protective function against excess current and resistive against deterioration in conversion efficiency and ignition or combustion of resistor without utilizing an excess current detecting resistor. The ringing choke converter comprises a switching element for converting DC input voltage into constant output voltage by the on-off operation of the switching element; an excess current protector connected to a control terminal of the switching element for ceasing operation of the switching element during the overload; an output capacitor connected to output terminals; a smoothing coil and a smoothing capacitor connected in series to both ends of the output capacitor; a ripple voltage detector for perceiving ripple voltages on the output capacitor; and a photo-coupler connected to the ripple voltage detector for driving the excess current protector based on output signals from the ripple voltage detector.

FIG. 4 illustrates a DC-DC converter of flyback type having the electric structure similar to those of the converters shown in the foregoing references. Unlike the converter shown in FIG. 3 utilizing the common mode choke coil 10, the converter shown in FIG. 4 comprises a low pass filter circuit which includes a normal mode choke coil 19 and a filtering capacitor 20 connected after output smoothing capacitor 9; a first voltage-dividing resistors 21 and 22 connected in parallel to output smoothing capacitor 9 before choke coil 19; a second voltage-dividing resistors 23 and 24 and a normal power source 16 connected in series to each other and connected after choke coil 19 and in parallel to first voltage dividing resistors 21 and 22; and a comparator 25 for comparing a first divided voltage $V_A$ on junction between resistors 21 and 22 and a second divided voltage $V_B$ on junction between resistors 23 and 24 to produce output signals $V_{OC}$ of high voltage level H to cease the operation of MOS-FET 7 for restriction of output current $I_O$. Other components in FIG. 4 are similar to those in FIG. 3.

The DC-DC converter 4 shown in FIG. 4 is designed to turn MOS-FET 7 on and off to produce AC voltage of high frequency on secondary winding 6b of transformer 6 and then convert it into DC voltage $V_{DC}$ through rectifying diode 8 and output smoothing capacitor 9, however, output smoothing capacitor 9 has an internal impedance which causes ripple components superimposed on resultant DC voltage. Choke coil 19 and filtering capacitor 20 cooperate to form a combined low pass filter circuit which serves to remove ripple components from output voltage $V_O$ which is then supplied to load 5 without ripple. Specifically, ripple components on output voltage $V_O$ across output smoothing capacitor 9 appear only on both ends of normal mode choke coil 19, and voltage across choke coil 19 naturally involves lots of ripple components which may have a correlation with output current $I_O$. Nevertheless, ripple components are not transmitted to load 5 due to absorption by filtering capacitor 20. On the other hand, choke coil 19 has a conductive winding of the own slight electric resistance which causes a voltage across choke coil 19 in proportion to output current $I_O$ through the conductive winding. Therefore, voltage across choke coil 19 means output current $I_O$ through load 5 with low power loss.

In this way, the DC-DC converter 4 is advantageous in that normal mode choke coil 19 can effectively diminish normal mode noises such as ripple and spike noises, however, disadvantageously induces a voltage involving many ripple components across choke coil 19. In using such a rectifying smoother 8, 9 of the capacitor input type, the converter 4 is effective for detection of output current $I_O$, however, detection circuit 11 cannot pick out stable values of output current $I_O$ because it fluctuates by moving ripple components before filtering capacitor 20 dependently on change in internal impedance, uneven capacitance and drifting thermal characteristics of output smoothing capacitor 9.

An object of the present invention is to provide a DC-DC converter capable of detecting output current through a load with accuracy and law power loss. Another object of the present invention is to provide a DC-DC converter which can achieve the double detection of excessive output current for improvement in safety.

SUMMARY OF THE INVENTION

The DC-DC converter according to the present invention comprises: at least one switching element (7) for converting intermittent DC input from a DC power source into electric power of high frequency by the on-off operation of the switching element (7); a rectifying smoother (8,9) for converting electric power of high frequency from the switching element (7) into DC output to a load (5); an inductance element (10) having a plurality of in-phase windings ($N_B$, $N_A$) wound around a common magnetic core and connected in a line between rectifying smoother (8,9) and load (5); a normal power source (16) for generating a reference voltage to define a rated value of electric current flowing through the load (5); a comparator (18) for comparing a detection voltage produced across one of the in-phase windings ($N_B$, $N_A$) of the inductance element (10) with the reference voltage from the normal power source (16) to produce an error signal between the detection voltage and reference voltage; and a controller (13) for controlling the on-off period of the switching element (7) to adjust the electric current to the load (5) in response to the error signal from the comparator (18).

As a same electric current $I_O$ flows through the windings ($N_B$, $N_A$) of inductance element (10) in the opposite directions to each other to produce in a magnetic core of inductance element (10) the opposed magnetic fluxes which countervail each other and any kind of noise such as ripple noise and spike noise causing voltage fluctuation. Accordingly, each winding ($N_A$, $N_B$) of inductance element (10) produces only a potential drop resulted from the inherent slight electrical resistance in conductive material for forming windings ($N_A$, $N_B$) so that each winding ($N_A$, $N_B$) produces a voltage ($V_L$) exactly proportional to electric current ($I_O$) flowing through load (5) to thereby enable the detection circuit (11) to appreciate output current ($I_O$) flowing from the converter to load (5) with less power loss and accuracy in view of voltage ($V_L$) across any one of plural windings ($N_A$, $N_B$) of inductance element (10). This can achieve protection of load (5) connected to the converter from excessive current flowing through load (5) and also to exactly operate a protective circuit against excessive output current.

BRIEF DESCRIPTION OF THE DRAWINGS

The above-mentioned and other objects and advantages of the present invention will be apparent from the following description in connection with preferred embodiments shown in the accompanying drawings wherein.

BEST MODE FOR CARRYING OUT THE INVENTION

Embodiments of DC-DC converters of flyback type according to the present invention are described hereinafter with reference to FIGS. 1 and 2 wherein same symbols are applied to denote similar elements shown in FIGS. 3 and 4.

Figure 1:
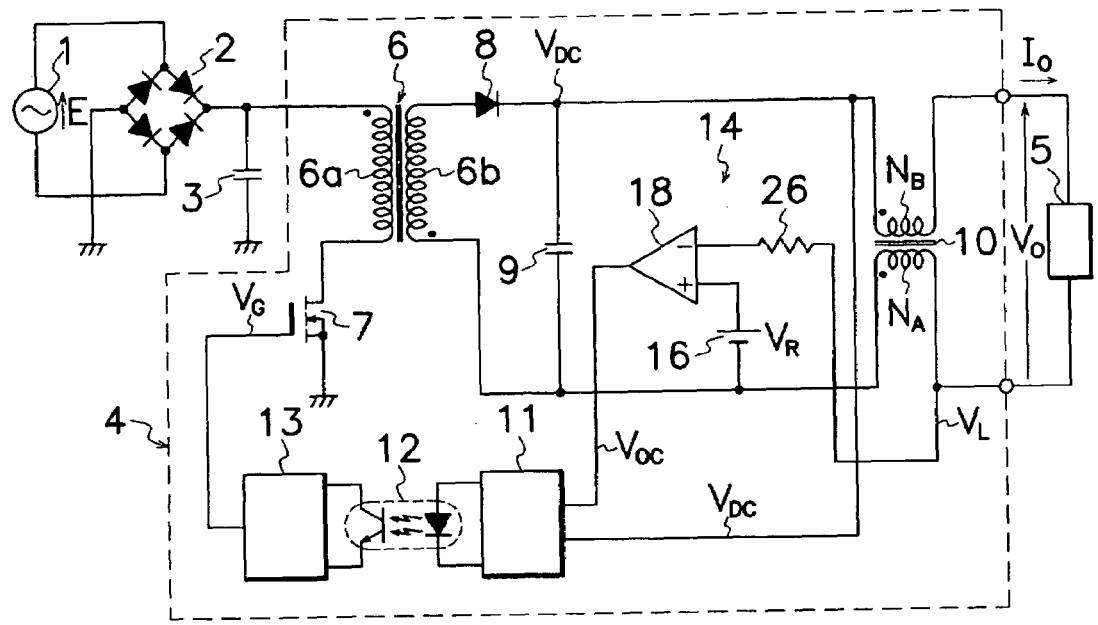
FIG. 1 is an electric circuit diagram of an embodiment showing a DC-DC converter of flyback type according to the present invention.

As shown in FIG. 1, the DC-DC converter 4 according to the present invention does not have current detecting resistor 15 and limiting resistor 17, but instead, is provided with a detective resistor 26 connected between one end of first winding $N_A$ of common mode choke coil 10 and inverted input terminal of error amplifier 18 for perceiving voltage $V_L$ applied on first winding $N_A$. In other words, the embodiment of the invention shown in FIG. 1 is different from the converter 4 shown in FIG. 3 in that error amplifier 18 of FIG. 1 produces an error signal $V_{OC}$ to provide control circuit 13 with overcurrent signals through photo-coupler 12 when detection voltage $V_L$ induced on first winding $N_A$ exceeds reference voltage $V_R$ of normal power source 16. Other electric structure in FIG. 1 than the foregoing is substantially identical as that shown in FIG. 3.

In operation of the converter 4 shown in FIG. 1, a same electric current $I_O$ flows through first and second windings $N_B$, $N_A$ of inductance element 10 in the opposite directions to each other to produce in magnetic core of inductance element 10 the opposed magnetic fluxes which countervail or cancel each other, and therefore, inductance element 10 does not produce undesirable voltage fluctuation resulted from normal mode noise such as ripple and spike noises. Accordingly, an electric potential or voltage across first winding $N_A$ or second winding $N_B$ involves only voltage drop resulted from the inherent slight electric resistance in conductive material for forming first or second winding $N_A$ or $N_B$ so that first or second winding $N_A$ or $N_B$ makes a voltage $V_L$ proportional to electric current $I_O$ flowing through load 5. Accordingly, detective resistor 26 detects across first winding $N_A$ the induced voltage which just means or corresponds to accurate output current $I_O$ through load 5 with less power loss. In another aspect, first and second windings $N_A$ and $N_B$ of common mode choke coil 10 are typically formed of conductive wire such as copper which has a positive temperature-resistance characteristic under which first and second windings $N_A$ and $N_B$ increase the electric resistance with elevation in temperature of those windings due to the heat sent during the operation in accordance with the Joule's law. In other words, detected voltage $V_L$ across first or second winding $N_A$ or $N_B$ increases with elevation in temperature of winding $N_A$ or $N_B$ to reduce and safely detect overcurrent, if any.

Figure 2:
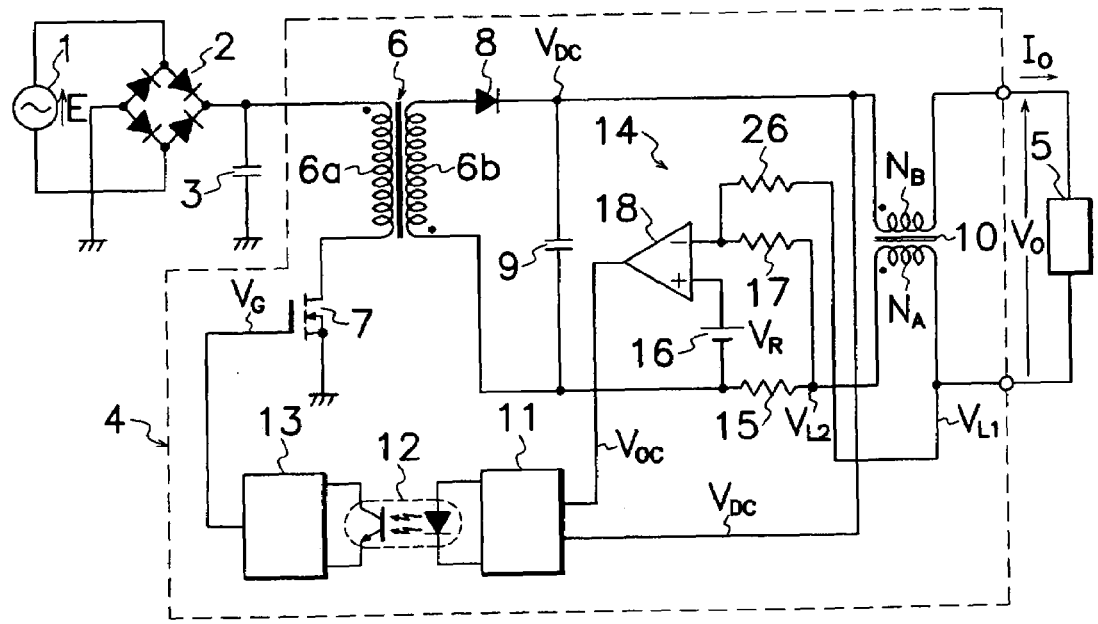
FIG. 2 is an electric circuit diagram of another embodiment of the present invention.
Figure 3:
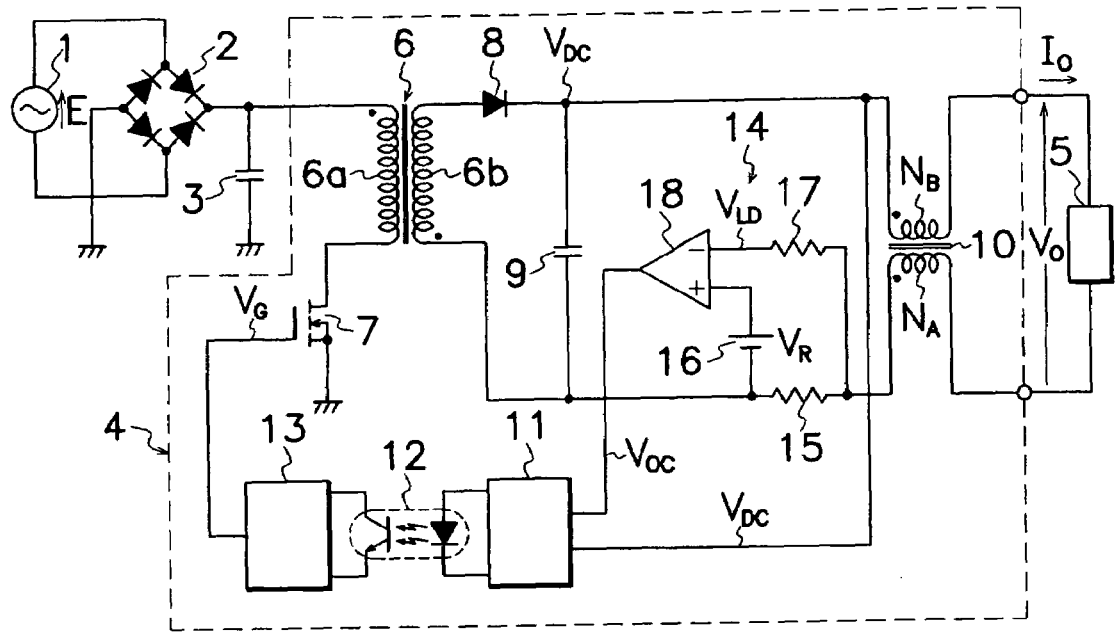
FIG. 3 is an electric circuit diagram of a first prior art DC-DC converter.
Figure 4:
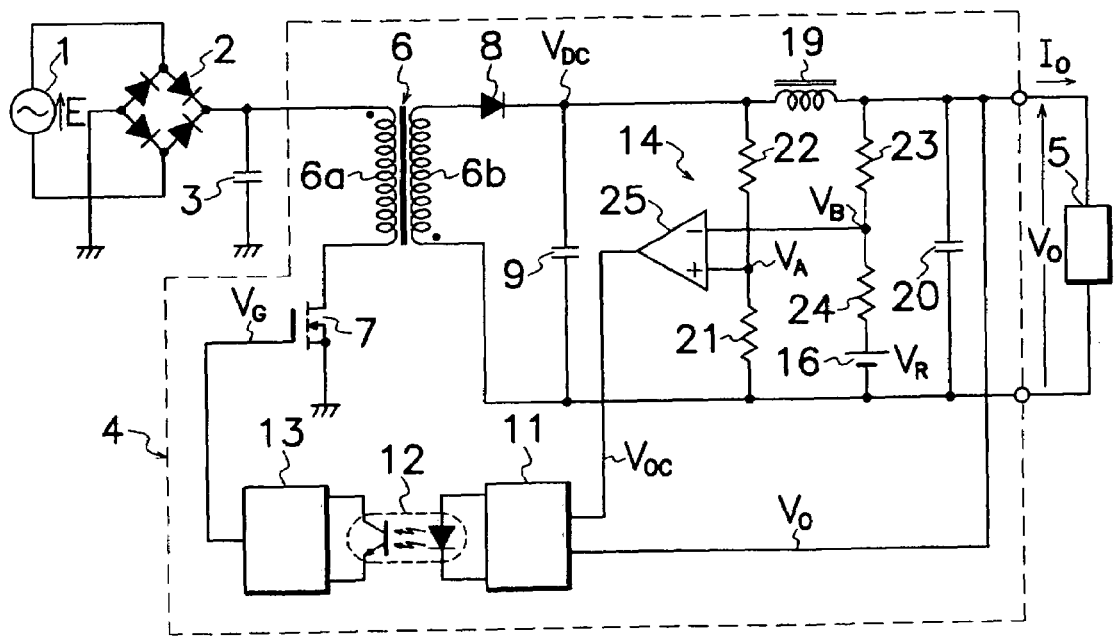
FIG. 4 is an electric circuit diagram of a second prior art DC-DC converter.

FIG. 2 illustrates another embodiment according to the present invention which comprises a detective resistor 26 in addition to limiting resistor 17 unlike the converter shown in FIG. 3. Error amplifier 18 in FIG. 2 has an inverted input terminal (−) connected to one end of first winding $N_A$ of common mode choke coil 10 through detective resistor 26 to detect voltage $V_{L1}$ induced across first winding $N_A$ and current detecting resistor 15 through limiting resistor 17 to detect overcurrent through current detecting resistor 15, and non-inverted terminal (+) connected to normal power source 16 for providing reference voltage $V_R$. Other electric structure in FIG. 2 than the foregoing is substantially identical as that shown in FIG. 3.

In operation of the converter 4 shown in FIG. 2, error amplifier 18 compares detection voltages $V_{L1}$ and $V_{L2}$ respectively applied on first winding $N_A$ through detective resistor 26 and on current detecting resistor 15 through limiting resistor 17 with reference voltage $V_R$. When both or one of detection voltages $V_{L1}$ and $V_{L2}$ exceeds reference voltage $V_R$ of normal power source 16, error amplifier 18 produces an error signal $V_{OC}$ to shorten the on period of MOS-FET 7, thereby restrict output current $I_O$ through load 5 and certainly prevent overcurrent from flowing through load 5. Also, the converter 4 shown in FIG. 2 enables double overcurrent detection by current detecting resistor 15 and one of first and second windings $N_A$ and $N_B$ of common mode choke coil 10 for improvement in safety by utilizing same components as but different electric structure from those in FIG. 3.

The foregoing embodiments of the present invention can be varied in various ways. For example, the invention can be applied to insulated type DC-DC converter such as forward type, bridge type, resonance type or non-insulated type DC-DC converter such as boost chopper type, step-down chopper type, boost step-down chopper type except flyback type. Also, in lieu of detective resistor 26 connected between forward end of first winding $N_A$ of common mode choke coil 10 and inverted input terminal (−) of error amplifier 18 to detect voltage induced on first winding $N_A$, the converter can be designed to connect detective resistor 26 between a forward end of second winding $N_B$ and non-inverted terminal (+) of error amplifier 18 and connect inverted terminal (−) of error amplifier 18 to normal power source 16 in order to detect voltage across second winding $N_B$ of common choke coil 10. In addition, available switching element 7 may include J-FET (Junction Type Field Effect Transistor), IGBT (Insulated Gate Bipolar Transistor), SIT (Static Induction Transistor), PNP and NPN bipolar transistors.

The present invention is in particular effectively applicable to DC-DC converter and switching power source with any output overcurrent limiter.

What is claimed is:

1. A DC-DC converter comprising:
   at least one switching element for converting intermittent DC input from a DC power source into electric power of high frequency by the on-off operation of the switching element,
   a rectifying smoother for converting the electric power of high frequency from the switching element into DC output to a load;
   an inductance element having a plurality of in-phase windings ($N_B$, $N_A$) wound around a common magnetic core and respectively connected in positive and negative lines between the rectifying smoother and load to remove a common mode noise;
   a normal power source for generating a reference voltage to define a rated value of electric current flowing through the load;
   a comparator for comparing a detection voltage detected from both ends of one of the in-phase windings ($N_B$, $N_A$) of the inductance element with the reference voltage from the normal power source to produce an error signal between the detection voltage and reference voltage; and
   a controller for controlling the on-off period of the switching element to adjust the electric current to the load in response to the error signal from the comparator.

2. The DC-DC converter of claim 1, further comprising a detective resistor connected between one of the in-phase windings ($N_B$, $N_A$) of the inductance element and an input terminal of the comparator.

3. The DC-DC converter of claim 1, further comprising a current detector connected in series to one of the in-phase windings ($N_B$, $N_A$) of the inductance element for picking out the electric current passing through the load as a voltage corresponding to the electric current value;
   wherein the comparator compares a voltage produced across one of the in-phase windings ($N_B$, $N_A$) of the inductance element, a detected voltage by the current detector or both of the voltage produced across one of the in-phase windings ($N_B$, $N_A$) of the inductance element and detected voltage by the current detector with the reference voltage of the normal power source to produce the error signal.

4. The DC-DC converter of claim 3, further comprising a detective resistor connected between one of the in-phase windings ($N_B$, $N_A$) of the inductance element and an input terminal of the comparator and;
   a limiting resistor connected between the current detector and an input terminal of the comparator.

* * * * *